United States Patent
Iisaka et al.

(10) Patent No.: US 7,953,602 B2
(45) Date of Patent: May 31, 2011

(54) DIGITAL VIDEO REPRODUCING APPARATUS FOR RECOGNIZING AND REPRODUCING A DIGITAL VIDEO CONTENT

(75) Inventors: Atsushi Iisaka, Osaka (JP); Atsushi Yamashita, Osaka (JP); Takuya Hirai, Osaka (JP)

(73) Assignee: Panasonic Corporation, Osaka (JP)

( * ) Notice: Subject to any disclaimer, the term of this patent is extended or adjusted under 35 U.S.C. 154(b) by 1064 days.

(21) Appl. No.: 11/666,678

(22) PCT Filed: Nov. 4, 2005

(86) PCT No.: PCT/JP2005/020300
§ 371 (c)(1),
(2), (4) Date: May 1, 2007

(87) PCT Pub. No.: WO2006/049249
PCT Pub. Date: May 11, 2006

(65) Prior Publication Data
US 2008/0208576 A1    Aug. 28, 2008

(30) Foreign Application Priority Data
Nov. 8, 2004   (JP) .................................. 2004-323970

(51) Int. Cl.
*G10L 11/00*   (2006.01)
*G10L 21/00*   (2006.01)
*G10L 15/00*   (2006.01)

(52) U.S. Cl. ........ 704/270; 704/231; 704/251; 704/275; 382/229; 382/321; 725/39; 725/57

(58) Field of Classification Search .................. 704/270, 704/270.1, 275, 231, 251; 382/229, 321; 725/39, 57
See application file for complete search history.

(56) References Cited

U.S. PATENT DOCUMENTS 5,031,206 A * 7/1991 Riskin ........................ 379/93.27
5,136,504 A * 8/1992 Fushimoto ...................... 704/10
5,809,471 A    9/1998 Brodsky
(Continued)

FOREIGN PATENT DOCUMENTS
EP    0 794 670    9/1997
(Continued)

OTHER PUBLICATIONS

Supplementary European Search Report dated Sep. 30, 2009 for corresponding European Application No. 05805411.5.

*Primary Examiner* — James S Wozniak
*Assistant Examiner* — Jialong He
(74) *Attorney, Agent, or Firm* — Wenderoth, Lind & Ponack, L.L.P.

(57) ABSTRACT

Character information recognition means extracts, through a character recognition process, character information from a selection button included in an index image. Based on text data having been outputted from the character information recognition means, index dictionary creation means creates an index dictionary usable for a speech recognition process performed by speech recognition means. The speech recognition means performs the speech recognition process by using speech data retrieved through an ADC and the index dictionary stored in storage means. Based on a result of the speech recognition process performed by the speech recognition means, reproduction control means performs reproduction control of a chapter. Thus, a desired button can be selected by speech, from chapter selection buttons displayed on a chapter selection image of a DVD video.

8 Claims, 11 Drawing Sheets

U.S. PATENT DOCUMENTS

| | | | |
|---|---|---|---|
| 5,890,123 A * | 3/1999 | Brown et al. | 704/270.1 |
| 6,141,004 A * | 10/2000 | Jeong | 715/723 |
| 6,289,165 B1 * | 9/2001 | Abecassis | 386/224 |
| 6,314,398 B1 * | 11/2001 | Junqua et al. | 704/257 |
| 6,370,316 B1 * | 4/2002 | Yamada et al. | 386/230 |
| 6,535,854 B2 * | 3/2003 | Buchner et al. | 704/275 |
| 6,643,620 B1 * | 11/2003 | Contolini et al. | 704/270 |
| 2002/0035477 A1 * | 3/2002 | Schroder et al. | 704/275 |
| 2002/0198721 A1 * | 12/2002 | Weiser | 704/275 |
| 2003/0069734 A1 * | 4/2003 | Everhart | 704/275 |
| 2004/0177317 A1 | 9/2004 | Bradstreet | |
| 2004/0181391 A1 * | 9/2004 | Inoue et al. | 704/10 |
| 2005/0027511 A1 * | 2/2005 | Ohguro | 704/9 |
| 2006/0075429 A1 * | 4/2006 | Istvan et al. | 725/39 |
| 2007/0143117 A1 * | 6/2007 | Conley | 704/275 |

FOREIGN PATENT DOCUMENTS

| | | |
|---|---|---|
| EP | 1 033 701 | 9/2000 |
| JP | 11-041538 | 2/1999 |
| JP | 2001-101805 | 4/2001 |
| JP | 2002-041081 | 2/2002 |
| JP | 2003-230094 | 8/2003 |
| JP | 2006-018336 | 1/2006 |

* cited by examiner

Fig. 6

| TEXT DATA | DISPLAY POSITION OF SELECTION BUTTON |
|---|---|
| an entrance ceremony | (100, 80) |
| an excursion | (100, 160) |
| an athletic meet | (100, 240) |
| a school festival | (100, 320) |
| a graduation ceremony | (100, 400) |

Fig. 7

| TEXT DATA | DISPLAY POSITION OF SELECTION BUTTON |
|---|---|
| 1 | (100, 80) |
| 2 | (100, 160) |
| 3 | (100, 240) |
| 4 | (100, 320) |
| 5 | (100, 400) |

Fig. 11

| KATAKANA DATA | TEXT DATA | DISPLAY POSITION OF SELECTION BUTTON |
|---|---|---|
| ニュウガクシキ<br>(NYUUGAKUSHIKI) | 入学式<br>(NYUUGAKUSHIKI) | (100, 80) |
| エンソク<br>(ENSOKU) | 遠足<br>(ENSOKU) | (100, 160) |
| ウンドウカイ<br>(UNDOUKAI) | 運動会<br>(UNDOUKAI) | (100, 240) |
| ブンカサイ<br>(BUNKASAI) | 文化祭<br>(BUNKASAI) | (100, 320) |
| ソツギョウシキ<br>(SOTSUGYOUSHIKI) | 卒業式<br>(SOTSUGYOUSHIKI) | (100, 400) |

Fig. 12

| INFORMATION UNIQUE TO DVD | | | | |
|---|---|---|---|---|
| TITLE | INDEX DICTIONARY | | REPRODUCTION HISTORY INFORMATION | |
| | TEXT DATA | DISPLAY POSITION OF SELECTION BUTTON | REPRODUCTION DATE AND TIME | COUNTER VALUE |
| SCHOOL EVENTS | an entrance ceremony | (100, 80) | 2004/01/01 12:05 | — |
| | an excursion | (100, 160) | — | — |
| | an athletic meet | (100, 240) | 2004/01/03 18:16 | 00:59:15 |
| | a school festival | (100, 320) | — | — |
| | a graduation ceremony | (100, 400) | — | — |
| ⋯ | | | | |
| AN OVERNIGHT TRIP | first day | (100, 160) | 2003/11/03 13:16 | — |
| | second day | (360, 160) | 2003/11/03 14:02 | — |
| ⋯ | | | | |

DIGITAL VIDEO REPRODUCING APPARATUS FOR RECOGNIZING AND REPRODUCING A DIGITAL VIDEO CONTENT

BACKGROUND OF THE INVENTION

1. Technical Field

The present invention relates to a digital video reproducing apparatus for reproducing a digital video content.

2. Background Art

Conventionally, in a digital video reproducing apparatus such as a DVD (Digital Versatile Disc) player, when a content is started to be reproduced, a list of chapters is displayed as an index image so that the chapters can be selected respectively by operating a key provided in an apparatus body and a remote control. Thus, a user can reproduce the content from a desired chapter.

Recently, a BS digital high-definition television may include a speech recognition function therein, and therefore, a channel can be switched by inputting a broadcasting station name, a channel name, and the like by speech.

Additionally, an apparatus for performing a speech recognition process on input speech and for, based on a result of the process, displaying, on a display, a character string corresponding to the input speech is proposed (see Patent Document 1, for example).

Patent Document 1: Japanese Laid-Open Patent Publication No. 11-41538

It would be convenient if, in a video reproducing apparatus such as a DVD player, a chapter could be selected by speaking a name of the chapter. However, in order for the chapter to be selected by speech, it is required that a reference table used for determining which chapter is indicated by a word spoken by the user be provided in advance.

Ordinarily, however, the aforementioned reference table is not included in a digital video content. Therefore, even if the speech recognition function which allows the word spoken by the user to be recognized is incorporated in the video reproducing apparatus, the chapter cannot be specified based on the word spoken by the user.

Thus, an object of the present invention is to provide a digital video reproducing apparatus for specifying a reproducing position of a digital video content by speech.

SUMMARY OF THE INVENTION

The present invention has the following features to attain the object mentioned above. Note that reference numerals and figure numbers in parentheses indicate correspondence with the drawings so as to assist understanding of the present invention, and do not limit the scope of the present invention.

A first aspect of the present invention is directed to a digital video reproducing apparatus (1) for reproducing a digital video content including: dictionary creation means (102) for creating, based on a signal of the digital video content, a dictionary usable for a speech recognition process; speech recognition means (104) for performing the speech recognition process by using the dictionary having been created by the dictionary creation means; and reproduction control means (105) for performing, based on a result of speech recognition performed by the speech recognition means, reproduction control of the digital video content.

In a second aspect of the present invention, based on the first aspect, character information recognition means (101) for recognizing character information from are producing position selection image (FIG. 2, FIG. 4, FIG. 5) included in a video signal of the digital video content and used for allowing a user to select a reproducing position of the digital video content, is further included, and the dictionary creation means creates, by using the character information having been recognized by the character information recognition means, an index dictionary used for allowing the user to select the reproducing position by speech.

In a third aspect of the present invention, based on the second aspect, index display means (106) for, when the reproducing position selection image is displayed on a display device, emphatically displaying, based on a result of recognition performed by the character information recognition means, a character string portion corresponding to the character information registered in the index dictionary based on the reproducing position selection image, is further included.

In a fourth aspect of the present invention, based on the second aspect, nonvolatile storage means (107) for storing in a nonvolatile manner, as chapter information of the digital video content having been used in a past, the character information having been recognized by the character information recognition means, is further included.

In a fifth aspect of the present invention, based on the fourth aspect, the nonvolatile storage means stores the character information having been recognized by the character information recognition means, along with history information indicating whether or not a portion of the digital video content corresponding to the character information has been reproduced in the past.

In a sixth aspect of the present invention, based on the fifth aspect, the nonvolatile storage means stores the character information having been recognized by the character information recognition means, along with the history information, and also along with a date and time when the portion of the digital video content corresponding to the character information has been reproduced.

In a seventh aspect of the present invention, based on the second aspect, the dictionary creation means creates the index dictionary by using, when a number of characters of the character information having been recognized by the character information recognition means exceeds a predetermined threshold, a reduced number of characters of the character information.

In an eighth aspect of the present invention, based on the second aspect, further included are: language determination means (101) for determining whether or not the character information having been recognized by the character information recognition means is in Japanese; code addition means (103) for, when the character information has not been recognized by the character information recognition means or when the character information having been recognized by the character information recognition means is not in English, adding a code to the reproducing position selection image in accordance with a predetermined rule; and index display means (106) for displaying, on a display device (5), the reproducing position selection image to which the code has been added by the code addition means. The dictionary creation means creates, by using the character information in English having been recognized by the character information recognition means and the code having been added by the code addition means to the reproducing position selection image, the index dictionary used for allowing the user to select the reproducing position by speech.

In a ninth aspect of the present invention, based on the first aspect, further included are: code addition means (103) for adding a code, in accordance with a predetermined rule, to a reproducing position selection image (FIG. 2, FIG. 4, FIG. 5) included in a video signal of the digital video content and displayed for allowing a user to select a reproducing position of the digital video content; and index display means (106) for displaying, on a display device (5), the reproducing position selection image to which the code has been added by the code addition means. The dictionary creation means creates, by using the code having been added by the code addition means to the reproducing position selection image, an index dictionary used for allowing the user to select the reproducing position by speech.

In a tenth aspect of the present invention, based on the first aspect, the dictionary creation means creates, by using text information included in a signal of the digital video content and used for allowing a user to select a reproducing position of the digital video content, an index dictionary used for allowing the user to select the reproducing position by speech.

According to the first aspect, a title of a content of digital TV, a chapter name of a content of a DVD video, and the like can be selected by speech.

According to the second aspect, for example, a chapter can be selected by speech, from a chapter selection image and the like of a DVD video and the like.

According to the third aspect, for example, a word to be spoken in order to select a desired chapter can be provided to a user in a clearly understandable manner.

According to the fourth aspect, for example, a user can see chapter information of a medium such as a DVD having been used in the past, without setting up the medium.

According to the fifth aspect, for example, a user can confirm which chapter has been reproduced and which chapter has not been reproduced in the past.

According to the sixth aspect, for example, a chapter having been watched in the past can be selected based on a reproduction date and time provided in the past.

According to the seventh aspect, for example, when a chapter name is long, the chapter can be more easily selected than, and without, speaking the whole chapter name.

According to the eighth aspect, for example, even a chapter not particularly provided with a chapter name or a chapter provided with a chapter name in a language other than English can be easily selected by speaking a code.

According to the ninth aspect, for example, even when a character string is not included in a chapter selection button provided in a chapter selection image of a DVD video and the like, a chapter can be selected by speaking a code.

According to the tenth aspect, for example, when text information corresponding to a selection button provided in a video is, as in a content of digital TV, included in the content in advance, a dictionary to be used for speech recognition can be easily created by using the text information.

BRIEF DESCRIPTION OF THE DRAWINGS

FIG. 6 is a first example of an index dictionary.

FIG. 7 is a second example of the index dictionary.

FIG. 11 is a third example of the index dictionary.

FIG. 12 is an example of information stored, along with the index dictionary, in storage means 107.

Figure 1:
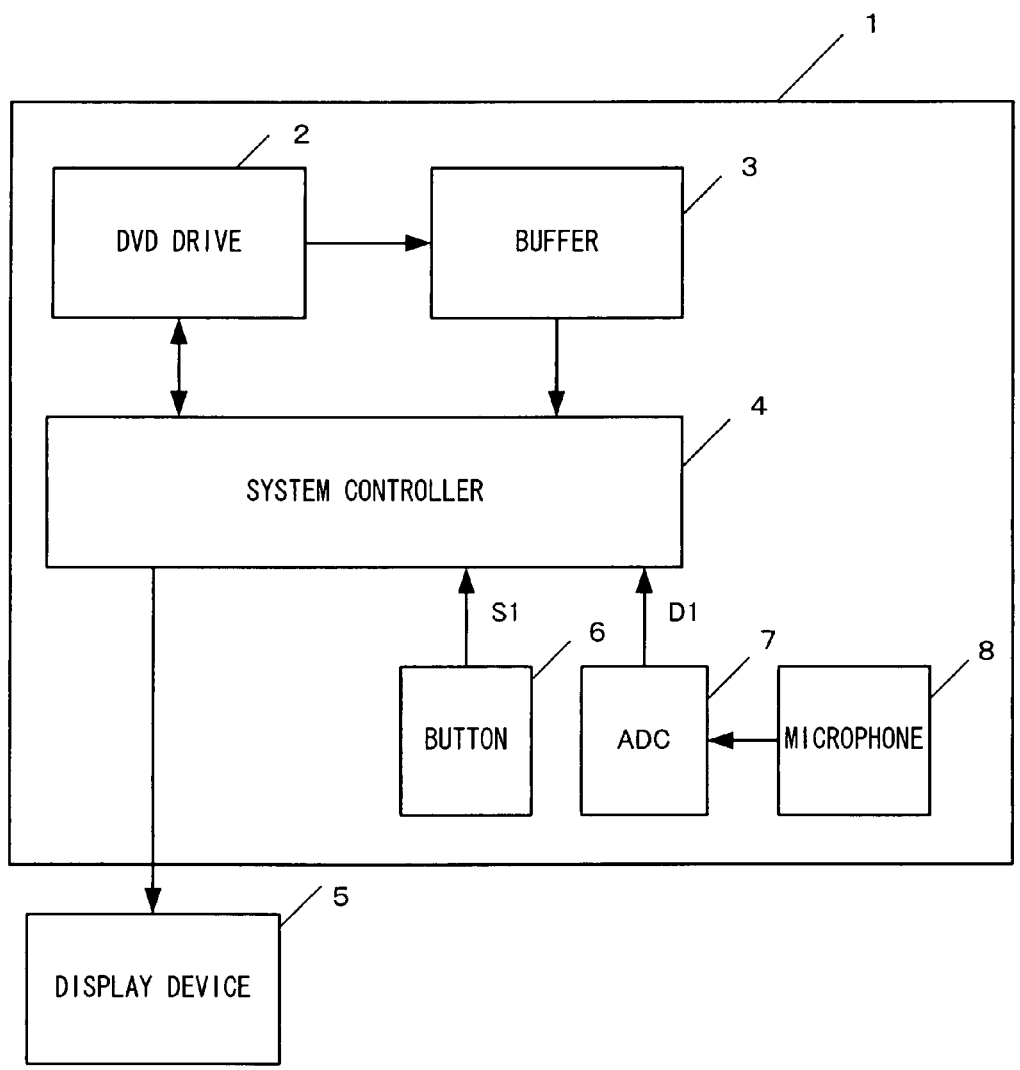
FIG. 1 is a diagram showing a structure of a digital video reproducing apparatus according to an embodiment of the present invention.

DESCRIPTION OF THE REFERENCE CHARACTERS 1 digital video reproducing apparatus
2 DVD drive
3 buffer
4 system controller
5 display device
6 button
7 ADC
8 microphone
10 index image
20 background display
21-25 selection button
51-55 underline
61-65 speech mark
71, 72 code
81-85 code
101 character information recognition means
102 index dictionary creation means
103 code addition means
104 speech recognition means
105 reproduction control means
106 index display means
107 storage means

DETAILED DESCRIPTION OF THE INVENTION

With reference to the drawings, a digital video reproducing apparatus according to an embodiment of the present invention will be described below.

In FIG. 1, a digital video reproducing apparatus 1 includes a DVD drive 2 capable of reproducing a DVD video, a buffer 3 for temporarily storing a video reproduced by the DVD drive 2, a system controller 4 for controlling the digital video reproducing apparatus 1 as a whole, a display device 5 for displaying the video, a button 6 pressed by a user when a speech input is to be started, a microphone 8 used for inputting speech, and an ADC (Analog to Digital Converter) 7 for converting an analog speech signal provided from the microphone 8 into a digital speech signal. Note that the DVD drive 2 and the microphone 8 may not be necessarily incorporated in the digital video reproducing apparatus 1.

Figure 2:
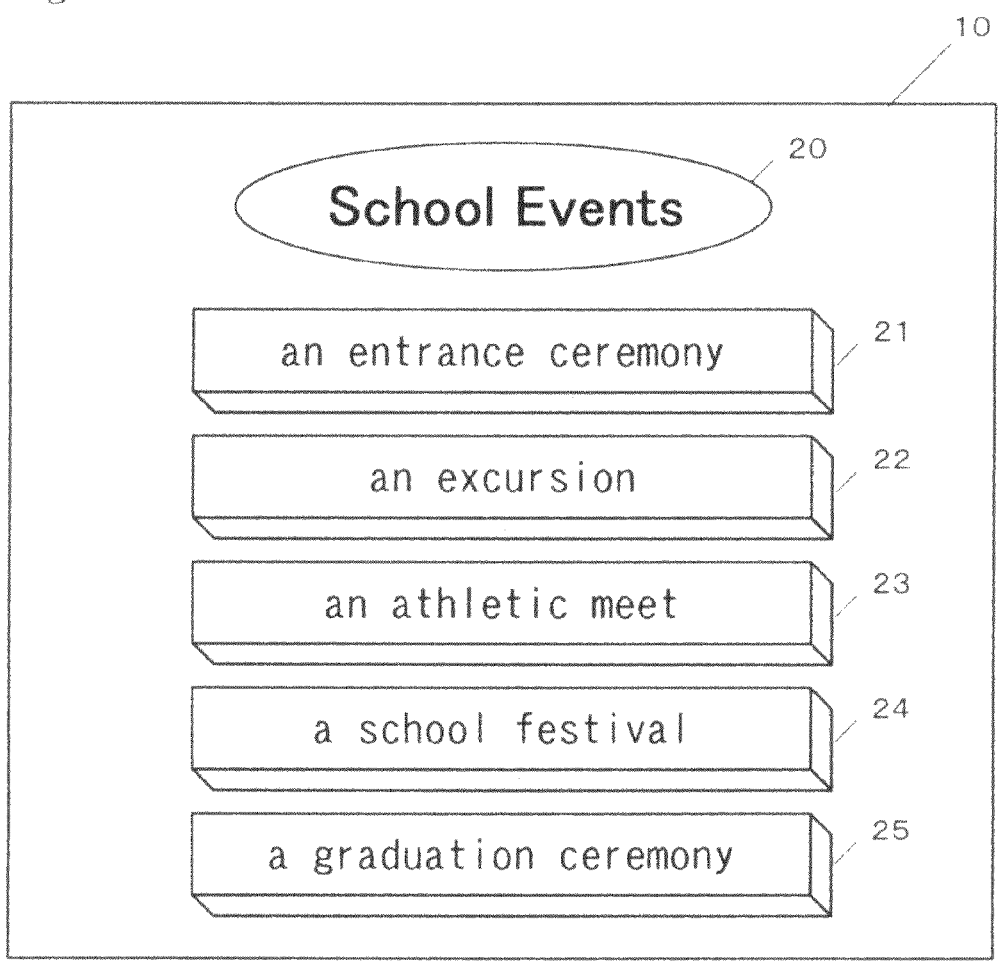
FIG. 2 is a first example of an index image.
Figure 3:
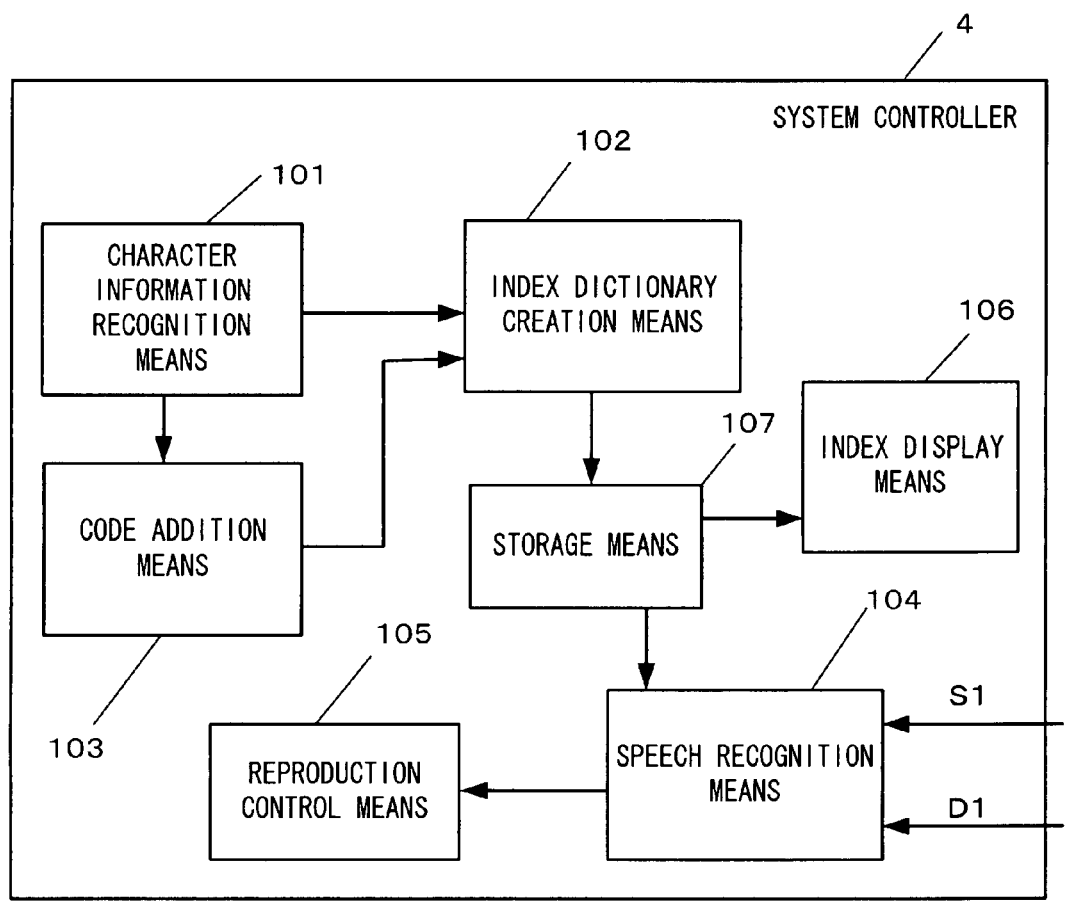
FIG. 3 is a diagram showing a function of a system controller 4.

When the user attaches, to the DVD drive 2, a DVD in which a digital video content (herein referred to as a DVD video) is recorded, an index image as shown in FIG. 2 is, as an initial image, read out from the DVD video and displayed on the display device 5. The DVD video is divided into a plurality of chapters, and selection buttons 21 to 25 used for respectively selecting the plurality of chapters are displayed in the index image. Note that the selection buttons are not necessarily limited to buttons as shown in FIG. 2, and outlines of the selection buttons may not be displayed (i.e., are in the same color as that of a background), or reduced images of videos provided at beginnings of the plurality of chapters may be used as the selection buttons. Note that 20 shown in FIG. 2 is not a selection button but a portion of a background display. FIG. 2 shows an example of a case where the DVD video includes five chapters. The user can select a desired chapter from a list of the chapters by using an input device not shown, so as to reproduce the DVD video from the desired chapter.

A chapter name ("an entrance ceremony", "an excursion", and the like) displayed in each of the selection buttons 21 to 25 is not included as text information (a character code) in the DVD video, and the index image including the selection buttons 21 to 25 is merely stored as image information in the DVD video. Information used for determining which region of the index image corresponds to which of the selection buttons, is stored in the DVD video.

Figure 5:
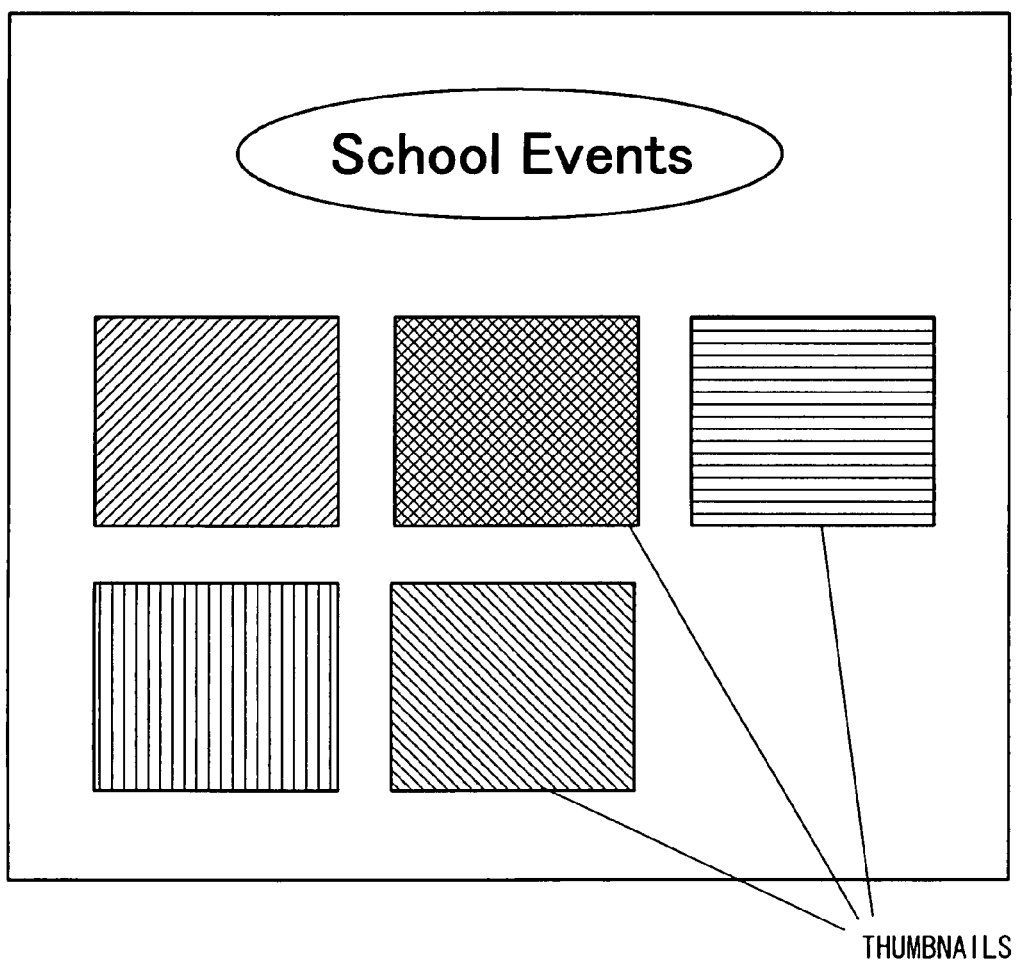
FIG. 5 is a third example of the index image.

Next, with reference to FIG. 5, functions of the system controller 4 will be described. The system controller 4 is realized by combination of hardware such as a microcomputer, a DSP, and a memory, and software stored in ROM and the like, and performs a recognition process on characters included in the image information, a speech recognition process, a chapter reproduction process, and the like. Specifically, the system controller 4 functions as character information recognition means 101, index dictionary creation means 102, code addition means 103, speech recognition means 104, reproduction control means 105, index display means 106, and storage means 107. Each means will be described in detail below.

The character information recognition means 101 extracts, through a character recognition process, character information from each of the selection buttons 21 to 25 (i.e., an image region used for selecting each of the chapters) of FIG. 2 included in the index image having been read out by the DVD drive 2. Note that the character information recognition means 101 has a function of determining whether or not the character information having been extracted through the character recognition process is in English, and a processing step provided thereafter varies depending on whether or not the character information in English has been extracted in this process. Note that the description herein is provided on the premise that the digital video reproducing apparatus 1 is used in an English-speaking country. However, for example, in a case where the digital video reproducing apparatus 1 is used in a Japanese-speaking country, the processing step provided thereafter varies depending on whether or not the character information in Japanese has been extracted. That is, more generally, the character information recognition means 101 may have a function of determining whether or not the character information having been extracted through the character recognition process is in a particular language.

Figure 4:
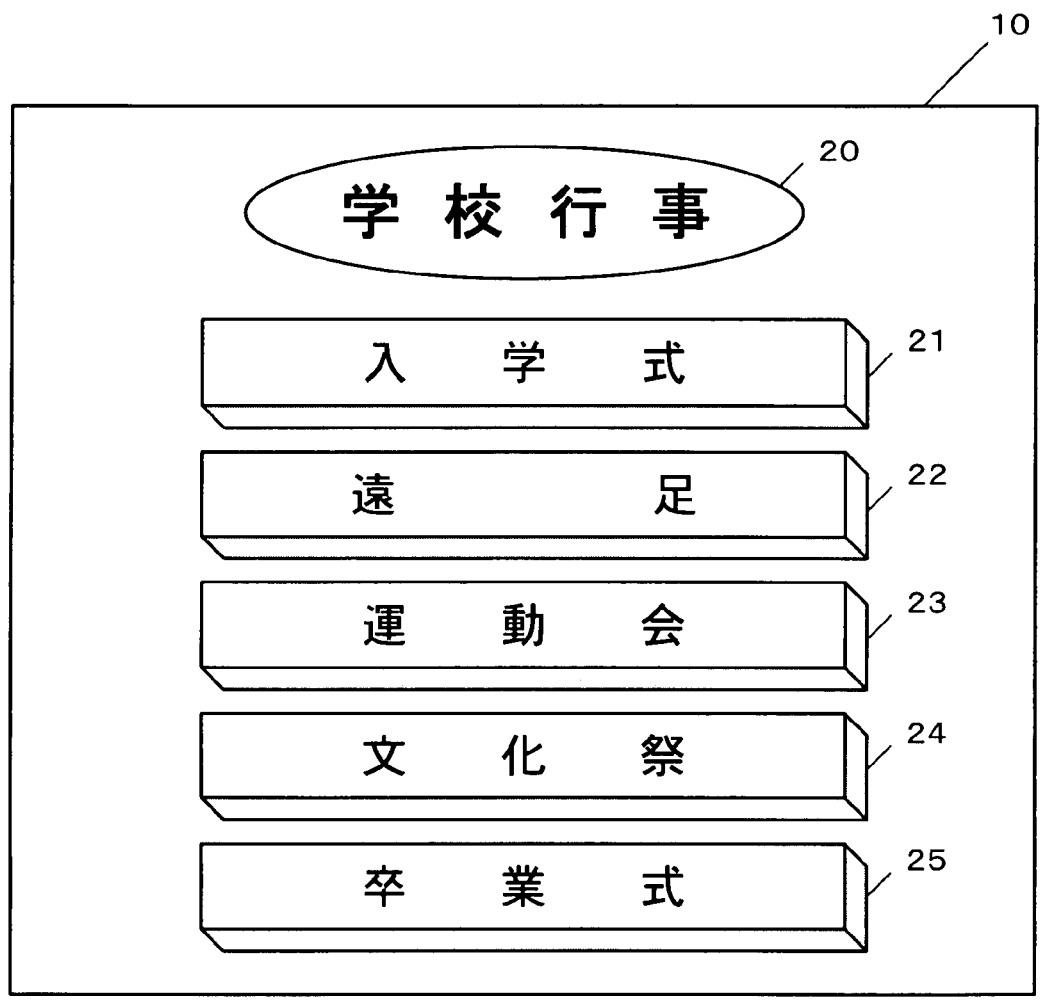
FIG. 4 is a second example of the index image.

In a case where the character information recognition means 101 has extracted the character information in English, the character information recognition means 101 outputs, as text data, the character information having been extracted, to the index dictionary creation means 102. In contrast, in a case where the character information in English has not been extracted (i.e., a case where the character information has not been extracted at all, or a case where the character information in a language other than English has been extracted), the character information recognition means 101 requests the code addition means 103 to perform a code addition process. For example, in a case, as shown in FIG. 4, where the chapter name is displayed in Japanese in each of the selection buttons, or a case, as shown in FIG. 5, where the selection buttons are the reduced images (thumbnails) of the videos provided at the beginnings of the chapters, the character information recognition means 101 requests the code addition means 103 to perform the code addition process.

Note that a well-known arbitrary technique can be used as a character recognition technique used for the character information recognition means 101.

The code addition means 103 assigns, in accordance with a predetermined rule, a code such as a number to each of the selection buttons not including the character information in English, and outputs, to the index dictionary creation means 102, text data corresponding to the code having been assigned to each of the selection buttons.

Based on the text data ("an entrance ceremony", "an excursion", and the like) having been outputted from the character information recognition means 101 or the text data ("1", "2", and the like) having been outputted from the code addition means 103, the index dictionary creation means 102 creates an index dictionary usable for the speech recognition process performed by the speech recognition means 104. A process of the index dictionary creation means 102 will be described more specifically below.

The index dictionary creation means 102 first checks whether or not the text data having been outputted from the character information recognition means 101 or the text data having been outputted from the code addition means 103 includes identical text data therein, and adds a number (more precisely, text data corresponding to the number) or the like after the identical text data when the identical text data is included, so that each of the identical text data can be distinguished. For example, in a case where the text data to be inputted to the index dictionary creation means 102 includes two "an excursion"s therein, one of the two "an excursion"s is converted to "excursion one" and the other is converted to "excursion two".

When the text data relating to all of the selection buttons included in the index image has been created, the index dictionary creation means 102 creates, by using the text data having been created, the index dictionary to be used for performing a speech recognition process, and stores the index dictionary into the storage means 107. The storage means 107 may be nonvolatile storage means which continues to retain, even when power is off, a stored content, or may be volatile storage means which loses, when power is off, the stored content. A display position, provided in the index image, of each of the selection buttons corresponding to the text data is also recorded into the index dictionary in association with the text data. FIG. 6 shows a content of the index dictionary created based on the index image of FIG. 2. FIG. 7 shows the content of the index dictionary created based on the index image of FIG. 4 or the content of the index dictionary created based on the index image of FIG. 5.

Note that the index dictionary creation means 102 records, as the text data, the text data to which the number or the like has been added on the grounds that a plurality of identical text data have been present as described above, and also records information (a flag) indicating that the text data being recorded is original text data to which the number or the like has been added, into the index dictionary in association with the text data being recorded.

Figure 8:
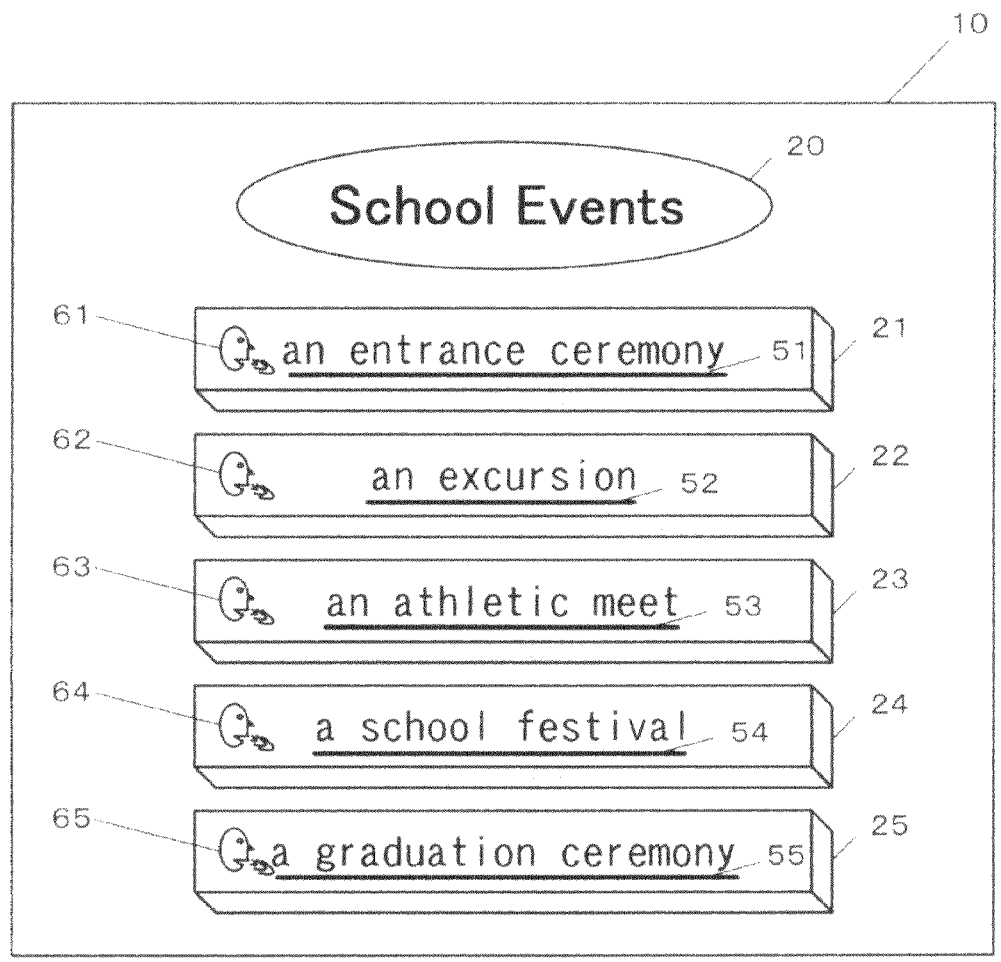
FIG. 8 is a first example of the index image having been processed by index display means 106.
Figure 9:
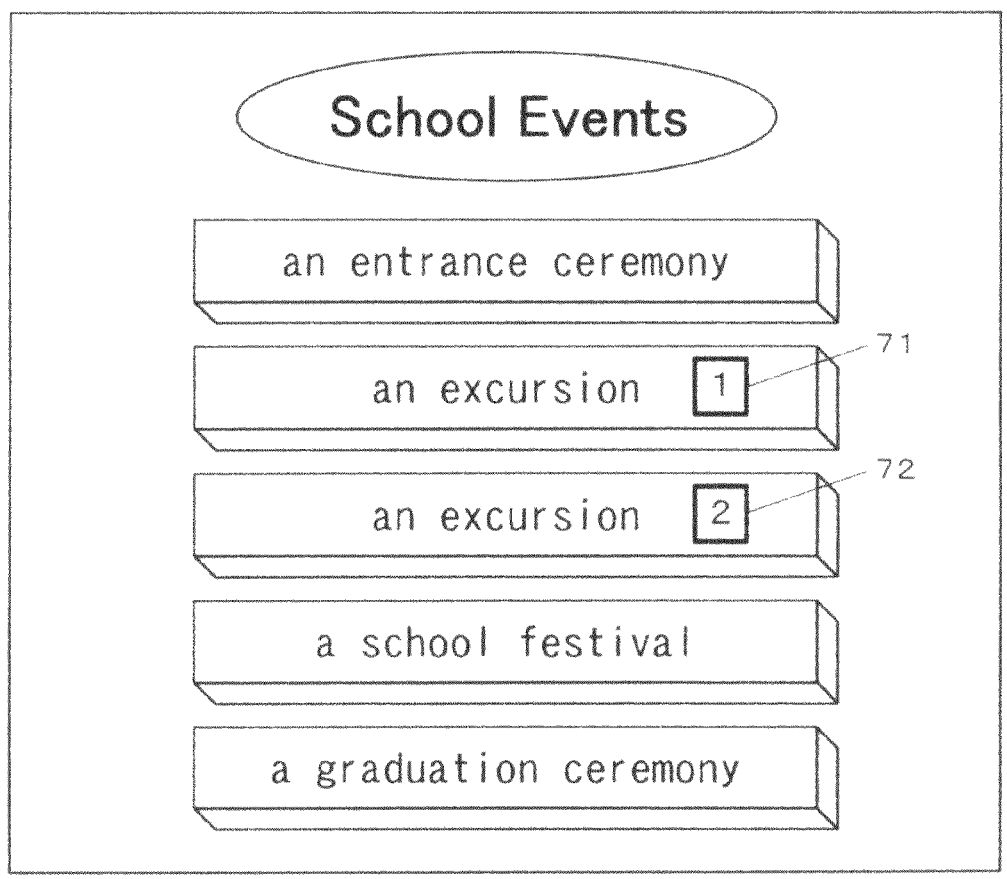
FIG. 9 is a second example of the index image having been processed by the index display means 106.
Figure 10:
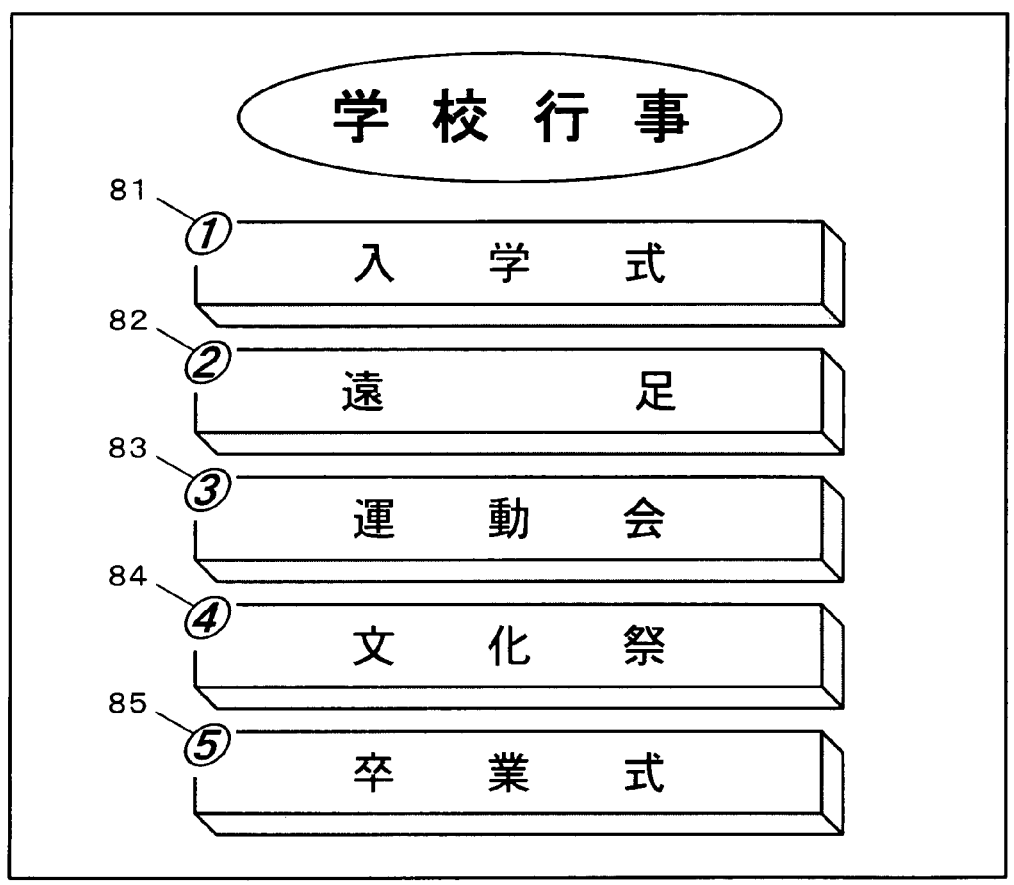
FIG. 10 is a third example of the index image having been processed by the index display means 106.

The index display means 106 performs display control for providing, to the user, a word to be spoken by the user in order to select each of the selection buttons included in the index image. More specifically, the index display means 106 obtains, as needed, from the character information recognition means 101, the display position, provided in the index image, of the character string having been recognized as being in English by the character information recognition means 101, and emphasizes the character string by, as shown in FIG. 8, drawing underlines 51 to 55 under the character string respectively; surrounding the character string by a frame; adding, in proximity to the character string, speech marks 61 to 65 for respectively indicating that the character string is a character string to be spoken; and the like. Further, as shown in FIG. 9, numbers (71, 72) are additionally displayed respectively after the character string having the text data to which the number or the like has been added by the index dictionary creation means 102. Furthermore, as shown in FIG. 10, codes (81 to 85) are assigned respectively by the code addition means 103 to the character string having been recognized as being in a language other than English by the character information recognition means 101, and then are additionally displayed. As a result of the process performed by the index display means 106 as described above, the user can recognize at a glance the character string to be spoken when the desired chapter is to be selected in the index image.

When the user presses the button 6 in order to start the speech input, a speech recognition start signal S1 is outputted from the button 6. When having received the speech recognition start signal S1, the speech recognition means 104 performs the speech recognition process by using both speech data D1 retrieved through the ADC 7 and the index dictionary stored in the storage means 107. When the text data corresponding to the speech data D1 has been detected in the index dictionary as a result of the speech recognition process, the speech recognition means 104 obtains, from the index dictionary, display position information of each of the selection buttons corresponding to the text data, and then outputs the display position information to the reproduction control means 105.

Based on the display position information having been received from the speech recognition means 104, the reproduction control means 105 specifies a chapter and starts reproducing the chapter.

Note that in a case where, in a Japanese-speaking country, the character information recognition means 101 has a function of determining whether or not the character information having been extracted through the character recognition process is in Japanese, and characters of the chapter name included in the index image provided in Japanese is represented in Kanji, the index dictionary creation means 102, in order to create the same dictionary as that of a character string to be pronounced, first converts the text data having been outputted from the character information recognition means 101 or the text data having been outputted from the code addition means 103, into Katakana data (「ニュウガクシキ」("nyuugakushiki"), 「エンソク」("ensoku"), 「イチ」("ichi"), 「ニ」("ni"), and the like). The text data having been outputted from the character information recognition means 101, the text data having been outputted from the code addition means 103, and the display position, provided in the index image, of each of the selection buttons corresponding thereto, are also recorded into the index dictionary in association with the Katakana data. FIG. 11 shows the content of the index dictionary created based on the index image of FIG. 4.

The above-described functions of the system controller 4 allow the user to select, by speech, an arbitrary selection button from the selection buttons included in the index image, and to start watching the chapter corresponding to the arbitrary selection button. Thus, according to the present embodiment, a chapter can be selected by speech, and therefore it is particularly useful for an in-car DVD reproducing apparatus. Further, a navigation function may be added to the present embodiment, and therefore, a navigation device including a function of reproducing a digital video content may be provided.

Note that nonvolatile storage means may be used as the storage means 107 in order to retain, even after the digital video reproducing apparatus 1 is turned off, the index dictionary having been created by the index dictionary creation means 102, and therefore, data having been stored in the past by the storage means 107 can be used when the digital video reproducing apparatus 1 is turned on after once being turned off. Thus, usability of the digital video reproducing apparatus 1 can be improved. An applied example in which the nonvolatile storage means is used as the storage means 107 will be described below.

In the applied example, the index dictionary having been created by the index dictionary creation means 102 is recorded into the storage means 107 in association with a title of the DVD video, information unique to the DVD, or other additional information as shown in FIG. 12. The information unique to the DVD may include, for example, a size of data, a length of the video, the number of the chapters, and the like which are recorded in the DVD. Further, when the chapter has been reproduced, the reproduction control means 105 stores, as reproduction history information, a date and time when the chapter has been reproduced, into the storage means 107 in association with the display position information of each of the selection buttons corresponding to the chapter. Furthermore, when the user has stopped reproducing the chapter in the middle thereof, the reproduction control means 105 stores, as the reproduction history information, a time counter value of the video provided at a point at which the chapter has been stopped, into the storage means 107 in association with the date and time when the chapter has been reproduced.

When power is applied to the digital video reproducing apparatus 1, the system controller 4 first confirms whether or not a DVD is inserted in the DVD drive 2. In a case where a DVD is inserted in the DVD drive 2, the system controller 4 confirms, with reference to information stored in the storage means 107 as shown in FIG. 12, whether or not the DVD currently inserted in the DVD drive 2 is a DVD having been inserted therein in the past. In a case where the DVD currently inserted in the DVD drive 2 is a DVD having been inserted therein in the past, the speech recognition process is performed by using the index dictionary having been created in the past. In a case where the DVD is a DVD inserted therein for the first time, an index dictionary is created based on the index image and is stored in the storage means 107, and the speech recognition process is performed by using the index dictionary having been created and stored. Thus, the trouble of creating anew the index dictionary used for the DVD having been used in the past can be saved, and therefore, time required from when the DVD is inserted into the DVD drive 2 to when the chapter can be selected by speech, can be reduced.

Further, when reproduction date and time information stored in the storage means 107 is used, information indicating whether or not each of the chapters has been reproduced in the past may be added by the index display means 106 to the index image, and then may be displayed on the display device 5.

Further, when counter value information stored in the storage means 107 is used, the user may reproduce, when reselecting the chapter having been stopped being reproduced in the middle thereof in the past, the chapter from a point at which the chapter has been stopped.

Note that a case where the digital video content recorded in the DVD is reproduced is described as an example of the present embodiment. However, the present invention is not limited thereto and the present invention can also be similarly applied to a case where a digital video content recorded in another recording medium is reproduced, a case where a digital video content provided via a communication line is reproduced, a case where a digital video content provided by a broadcast wave is reproduced, and the like. Note that in a case where text information corresponding to a selection button displayed in the video is, as in a content of digital TV and the like, included in the content in advance, the index dictionary creation means 102 may create an index dictionary by using the text information, even if the character information recognition means 101 does not perform the character recognition process.

A large number of in-car navigation systems having speech recognition functions are present and the systems capable of reproducing DVDs are widely available. Means according to the present invention for creating a dictionary usable for speech recognition from a digital signal is added to the aforementioned systems, thereby allowing a driver to safely select a chapter by speech even while driving, and is particularly useful when mounted in a car.

The invention claimed is:

1. A digital video reproducing apparatus for reproducing a digital video content comprising:
   a character information recognition means for recognizing character information of image regions of a selection image included in a video signal of the digital video content and allowing selection of a reproducing position of the digital video content by speech;
   a dictionary creation means for creating, using the character information in the digital video content, an index dictionary, the index dictionary allowing selection of the reproducing position of the digital video content by speech, the index dictionary associating the image regions of the selection image with the character information;
   a speech recognition means for performing a speech recognition process by using the index dictionary having been created by the dictionary creation means;
   a reproduction control means for performing, based on a result of speech recognition process performed by the speech recognition means, reproduction control of the digital video content;
   a language determination means for determining whether the character information having been recognized by the character information recognition means is in Japanese;
   a code addition means for, when the character information has not been recognized by the character information recognition means or when the character information having been recognized by the character information recognition means is not in English, adding a code to the reproducing position selection image in accordance with a predetermined rule; and
   an index display means for displaying, on a display device, the reproducing position selection image to which the code has been added by the code addition means,
   wherein the dictionary creation means creates, by using the character information in English having been recognized by the character information recognition means and the code having been added by the code addition means to the reproducing position selection image, the index dictionary allowing the user to select the reproducing position by speech.

2. The digital video reproducing apparatus according to claim 1, further comprising an index display means for, when the image regions of the selection image are displayed on a display device, displaying, based on a result of recognition performed by the character information recognition means, a character string portion corresponding to the character information in the index dictionary based on the image regions of the selection image.

3. The digital video reproducing apparatus according to claim 1, further comprising a nonvolatile storage means for storing in a nonvolatile manner, as chapter information of the digital video content having been used in a past, the character information having been recognized by the character information recognition means.

4. The digital video reproducing apparatus according to claim 3, wherein the nonvolatile storage means stores the character information having been recognized by the character information recognition means, along with history information indicating whether a portion of the digital video content corresponding to the character information has been reproduced in the past.

5. The digital video reproducing apparatus according to claim 4, wherein the nonvolatile storage means stores the character information having been recognized by the character information recognition means, along with the history information, and also along with a date and a time when the portion of the digital video content corresponding to the character information has been reproduced.

6. The digital video reproducing apparatus according to claim 1, wherein the dictionary creation means creates the index dictionary by using, when a number of characters of the character information having been recognized by the character information recognition means exceeds a predetermined threshold, a reduced number of characters of the character information.

7. The digital video reproducing apparatus according to claim 1, further comprising:
   a code addition means for adding a code, in accordance with a predetermined rule, to an image region of the selection image included in a video signal of the digital video content and displayed for allowing a user to select a reproducing position of the digital video content by speech; and
   an index display means for displaying, on a display device, the image region of the selection image to which the code has been added by the code addition means,
   wherein the dictionary creation means creates, by using the code having been added by the code addition means to the reproducing position selection image, the index dictionary allowing the user to select the reproducing position by speech.

8. The digital video reproducing apparatus according to claim 1, wherein the dictionary creation means creates, by using text information included in a signal of the digital video content and allows a user to select a reproducing position of the digital video content, the index dictionary allowing the user to select the reproducing position by speech.

* * * * *